US012576367B2

(12) United States Patent (10) Patent No.: US 12,576,367 B2
Strid et al. (45) Date of Patent: Mar. 17, 2026

(54) POLYETHYLENE MEMBRANE ACOUSTIC ASSEMBLY

(71) Applicant: W. L. Gore & Associates, Inc., Newark, DE (US)

(72) Inventors: Jason Strid, Newark, DE (US); Guy Sbriglia, Newark, DE (US); Thomas Tolt, Newark, DE (US); Scott Zero, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 204 days.

(21) Appl. No.: 18/688,139

(22) PCT Filed: Aug. 29, 2022

(86) PCT No.: PCT/US2022/075554
§ 371 (c)(1),
(2) Date: Feb. 29, 2024

(87) PCT Pub. No.: WO2023/034730
PCT Pub. Date: Mar. 9, 2023

(65) Prior Publication Data
US 2025/0121334 A1 Apr. 17, 2025

(30) Foreign Application Priority Data

Aug. 30, 2021 (WO) ................ PCT/US2021/048204

(51) Int. Cl.
| | |
|---|---|
| *B01D 71/26* | (2006.01) |
| *B01D 46/54* | (2006.01) |
| *B01D 69/02* | (2006.01) |
| *H04R 1/02* | (2006.01) |
| *H04R 1/08* | (2006.01) |

(52) U.S. Cl.
CPC ......... *B01D 71/261* (2022.08); *B01D 46/543* (2013.01); *B01D 69/02* (2013.01);
(Continued)

(58) Field of Classification Search
CPC .......... H04R 1/023; H04R 1/086; H04R 7/16; B32B 27/36; C08L 23/06; D01F 6/00;
(Continued)

(56) References Cited

U.S. PATENT DOCUMENTS

| | | | | |
|---|---|---|---|---|
| 9,253,297 B2 * | 2/2016 | Abe | ........................ | H04M 1/03 |
| 2015/0373439 A1 | 12/2015 | Mori | | |

(Continued)

FOREIGN PATENT DOCUMENTS

| | | |
|---|---|---|
| EP | 2665511 A1 | 11/2013 |
| EP | 3086570 A1 | 10/2016 |

(Continued)

OTHER PUBLICATIONS

International Preliminary Report on Patentability received for PCT Patent Application No. PCT/US2022/075554, mailed on Mar. 14, 2024, 13 pages.

(Continued)

*Primary Examiner* — Rasha S Al Aubaidi

(57) ABSTRACT

An assembly includes an acoustic device. The acoustic device can include a polyethylene membrane. The polyethylene membrane can have first direction and a second direction, the second direction being orthogonal to the first direction. The polyethylene membrane can have a surface area per volume of at least $39 \times 10^6$/m. The polyethylene membrane can have a geometric mean tensile modulus of 250 to 750 MPa. The polyethylene membrane can have a maximum tensile modulus in the first direction of 440 to 915 MPa. The polyethylene membrane can have a maximum tensile modulus in the second direction of 275 to 515 MPa. The polyethylene membrane can be an expanded polyethylene membrane.

15 Claims, 2 Drawing Sheets

(52) U.S. Cl.
CPC ............. *H04R 1/023* (2013.01); *H04R 1/086* (2013.01); *B01D 2325/02* (2013.01); *B01D 2325/04* (2013.01); *B01D 2325/20* (2013.01); *B01D 2325/24* (2013.01)

(58) Field of Classification Search
CPC .... G10K 11/00; B01D 71/261; B01D 46/543; B01D 69/02; B01D 2325/04
See application file for complete search history.

(56) References Cited

U.S. PATENT DOCUMENTS

| | | | |
|---|---|---|---|
| 2017/0266865 | A1 | 9/2017 | Zhang et al. |
| 2021/0127185 | A1 | 4/2021 | Kenaley et al. |
| 2021/0251095 | A1 | 8/2021 | Fukushima et al. |

FOREIGN PATENT DOCUMENTS

| | | | |
|---|---|---|---|
| JP | 2004-083811 | A | 3/2004 |
| JP | 2010-241047 | A | 10/2010 |
| JP | 2016-210848 | A | 12/2016 |
| JP | 2020-184758 | A | 11/2020 |
| WO | 2012/099610 | A1 | 7/2012 |
| WO | 2022/092300 | A1 | 5/2022 |

OTHER PUBLICATIONS

International Search Report and Written Opinion received for PCT Patent Application No. PCT/US2022/075554, mailed on Jan. 30, 2023, 17 pages.
Invitation to pay additional fees received for PCT Patent Application No. PCT/US2022/075554, mailed on Dec. 8, 2022, 12 pages.

* cited by examiner

POLYETHYLENE MEMBRANE ACOUSTIC ASSEMBLY

CROSS-REFERENCE TO RELATED APPLICATION

This application is a national phase application of PCT Application No. PCT/US2022/075554, internationally filed on Aug. 29, 2022, which claims priority to PCT Application No. PCT/US2021/048204, internationally filed on Aug. 30, 2021, which are herein incorporated by reference in their entireties for all purposes.

FIELD

This disclosure relates generally to acoustic assemblies. More particularly, this disclosure relates to acoustic assemblies including a polyethylene membrane.

BACKGROUND

Acoustic membrane assemblies can allow sound to propagate through and past a membrane and to and from an acoustic device. Acoustic membranes can also prevent ingress of water, dust, and other contaminants.

SUMMARY

In some embodiments, an assembly includes an acoustic device. In some embodiments, the acoustic device includes a polyethylene membrane. In some embodiments the polyethylene membrane has a first direction and a second direction, the second direction being orthogonal to the first direction. In some embodiments, the polyethylene membrane has a thickness of 0.5 μm to 14 μm. In some embodiments, the thickness defines a thickness direction and the first and second directions are orthogonal to the thickness direction. In some embodiments, the polyethylene membrane has a surface area per volume of at least $39 \times 10^6$/m. In some embodiments, the polyethylene membrane has a geometric mean tensile modulus of 250 to 750 MPa. In some embodiments, the polyethylene membrane has a maximum tensile modulus in a first direction of 440 to 915 MPa. In some embodiments, the polyethylene membrane has a maximum tensile modulus in a second direction of 275 to 515 MPa.

In some embodiments, the acoustic device is one of a speaker, a microphone, or any combination thereof.

In some embodiments, the acoustic device has a transmission loss (dB) that varies by less than 2.1 dB when tested using a WEP test at 24 hours after 1 bar open hole challenge @ 3 KHz.

In some embodiments, the polyethylene membrane has a tensile modulus balance of 1 to 2.1.

In some embodiments, the geometric mean tensile modulus is from 350 to 650 MPa.

In some embodiments, the polyethylene membrane has a porosity of 50% to 95%.

In some embodiments, the polyethylene membrane has a porosity of 55% to 86%.

In some embodiments, a % recovery at 1 hour after 1 bar open hole challenge is at least 69%.

In some embodiments, the polyethylene membrane has a bubble point from 7 psi to 200 psi.

In some embodiments, the polyethylene membrane has a permeability from $1 \times 10^{-15}$ m$^2$ to $8 \times 10^{-15}$ m$^2$.

In some embodiments, the polyethylene membrane has a permeability from $3 \times 10^{-16}$ m$^2$ to $7.4 \times 10^{-15}$ m$^2$.

In some embodiments, the polyethylene membrane is an expanded polyethylene membrane.

In some embodiments, an assembly includes an acoustic device. In some embodiments, the acoustic device includes a polyethylene membrane. In some embodiments, a % recovery at 1 hour after 1 bar open hole challenge is at least 69%.

In some embodiments, the acoustic device has a transmission loss (dB) that varies by less than 2.1 dB when tested using a WEP test at 24 hours after 1 bar open hole challenge @ 3 KHz.

In some embodiments, the acoustic device is one of a speaker, a microphone, or any combination thereof.

In some embodiments, the polyethylene membrane has a thickness of 0.5 μm to 14 μm.

In some embodiments, the polyethylene membrane has a porosity of 50% to 95%.

In some embodiments, the polyethylene membrane has a porosity of 55% to 86%.

In some embodiments, the polyethylene membrane has a bubble point from 7 psi to 200 psi.

In some embodiments, the polyethylene membrane has a permeability from $1 \times 10^{-15}$ m$^2$ to $8 \times 10^{-15}$ m$^2$.

In some embodiments, the polyethylene membrane has a permeability from $3 \times 10^{-16}$ m$^2$ to $7.4 \times 10^{-15}$ m$^2$.

In some embodiments, the polyethylene membrane has a first direction and a second direction, the second direction being orthogonal to the first direction, a surface area per volume of at least $39 \times 10^6$/m; a geometric mean tensile modulus of 250 to 750 MPa; a maximum tensile modulus in the first direction of 440 to 915 MPa; and a maximum tensile modulus in the second direction of 275 to 515 MPa.

In some embodiments, the polyethylene membrane has a tensile modulus balance of 1 to 2.1.

In some embodiments, the geometric mean tensile modulus is from 250 to 650 MPa.

In some embodiments, the polyethylene membrane is an expanded polyethylene membrane.

In some embodiments, an assembly includes an acoustic device. In some embodiments, the acoustic device includes a polyethylene membrane. In some embodiments, the acoustic device has a transmission loss (dB) that varies by less than 2.1 dB when tested using a WEP test at 24 hours after 1 bar open hole challenge @ 3 KHz.

In some embodiments, the polyethylene membrane has a first direction and a second direction, the second direction being orthogonal to the first direction, a surface area per volume of at least $39 \times 10^6$/m; a geometric mean tensile modulus of 250 to 750 MPa; a maximum tensile modulus in the first direction of 440 to 915 MPa; and a maximum tensile modulus in the second direction of 275 to 515 MPa.

In some embodiments, the polyethylene membrane has a tensile modulus balance of 1 to 2.1.

In some embodiments, the geometric mean tensile modulus is from 250 to 650 MPa.

In some embodiments, the surface area per volume is from $39 \times 10^6$/m to $70 \times 10^6$/m.

In some embodiments, a % recovery at 1 hour after 1 bar open hole challenge is at least 69%.

In some embodiments, the acoustic device is one of a speaker, a microphone, or any combination thereof.

In some embodiments, the polyethylene membrane has a thickness of 0.5 μm to 14 μm.

In some embodiments, the polyethylene membrane has a porosity from 50% to 95%.

In some embodiments, the polyethylene membrane has a porosity from 55% to 86%.

In some embodiments, the polyethylene membrane has a bubble point of 7 psi to 200 psi.

In some embodiments, the polyethylene membrane has a permeability from $1\times10^{-15}$ m$^2$ to $8\times10^{-15}$ m$^2$.

In some embodiments, the polyethylene membrane has a permeability from $3\times10^{-16}$ m$^2$ to $7.4\times10^{-15}$ m$^2$.

In some embodiments, the polyethylene membrane is an expanded polyethylene membrane.

In some embodiments, the polyethylene membrane has a thickness, the thickness defining a thickness direction, and the first and second directions are each orthogonal to the thickness direction.

In some embodiments, the maximum tensile modulus in the first direction is greater than the maximum tensile modulus in the second direction.

In some embodiments, the first direction is one of the longitudinal direction and the transverse direction of the polyethylene membrane and the second direction is the other one of the longitudinal direction and the transverse direction of the polyethylene membrane.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

Figure 1:
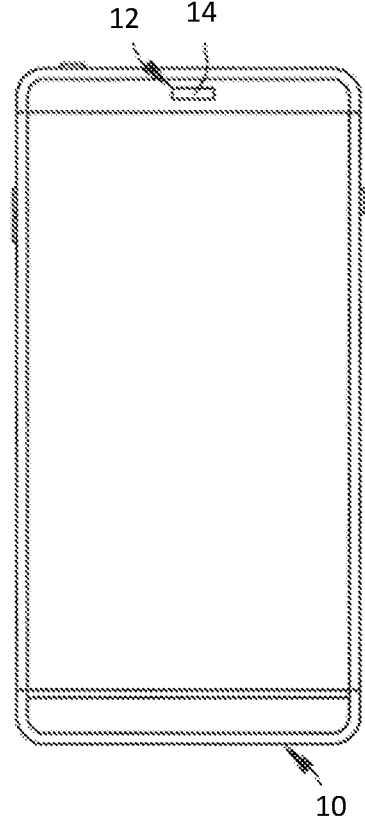
FIG. 1 illustrates a front view of an assembly including an acoustic device, according to some embodiments.

There is an ongoing need for improved acoustic membranes. Some embodiments described herein can advantageously achieve a low acoustic loss and variability while providing mechanical protection in immersion applications. Some embodiments described herein can advantageously avoid overstretching of the membrane, providing for similar performance of the acoustic membrane over time. That is, avoiding plastic deformation of the membrane can provide for a reduction in performance degradation over time.

Some embodiments of the present disclosure are directed to a predominantly reactive supported acoustic membrane. In a predominantly reactive mode, sound transmits through a combination of the vibration of the membrane in the active area and within the gas phase in open porosity of the membrane.

In some embodiments, an assembly includes an acoustic device. In some embodiments, the acoustic device is one of a speaker, a microphone, or any combination thereof. In some embodiments, the acoustic device includes a polyethylene membrane. In some embodiments, the polyethylene membrane is an expanded polyethylene membrane. In some embodiments, the polyethylene membrane has a fibrillated microstructure.

As used herein, the term "membrane" refers to an article, such as a sheet-like article, having three dimensions defined by three mutually perpendicular axes or directions in which two of the dimensions are typically larger than the third. For instance, the two larger dimensions are at least an order of magnitude greater than the smallest, third, dimension. Thus, the smallest, third dimension may represent the thickness of the membrane. This thickness can be measured along the third axis or direction, referred to herein as the thickness direction of the membrane.

The membrane may have opposing first and second surfaces, in which the surfaces are separated by the thickness of the membrane i.e. the shortest distance between opposing first and second surfaces of the membrane. This distance may be defined by a line orthogonal to the planes of both of the first and second surfaces. Thus, the thickness direction may be a direction parallel to a line defining the thickness of the membrane.

The first and second axes or directions are both orthogonal to the thickness direction of the membrane. The first and second directions therefore define a plane perpendicular to the thickness direction of the membrane. The plane defined by the first and second directions is therefore parallel to or overlaps with the planar sheet of the membrane.

In some embodiments, the first direction is selected from one of the longitudinal direction and transverse direction of the membrane and the second direction is selected from the other of the longitudinal direction and transverse direction of the membrane. In some embodiments, the first direction is selected from one of the machine direction and transverse direction of the membrane and the second direction is selected from the other of the machine direction and transverse direction of the membrane.

In some embodiments, a maximum tensile modulus may be determined for each of the first and second directions. The first direction may be assigned to that direction having the larger maximum tensile modulus. The second direction may be assigned to that direction having the smaller maximum tensile modulus.

FIG. 1 shows an external front view of an electronic device 10, according to some embodiments. In the illustrated embodiment, the electronic device 10 is a cellular phone having an opening 12. The opening 12 may be a narrow slot or a circular aperture. Although one opening 12 is shown, it should be appreciated that the number, size, and shape of openings in the electronic device 10 may vary. It is to be appreciated that the type of electronic device 10 can also vary beyond a cellular phone. A protective cover assembly 14 is shown covering the opening 12 to prevent intrusion of moisture, debris, or other particles into the electronic device 10. The protective cover assembly 14 is suitable for any size of opening and is not particularly limited. Structures disclosed herein may apply equally to openings for sound passage in the protective covers of any comparable electronic device, such as laptop computers, tablets, cameras, smartwatches, portable microphones, or the like. To allow the protective cover assembly 14 to be mounted, the size of the protective cover assembly 14 is greater than a maximum diameter of the opening 12.

Figure 2:
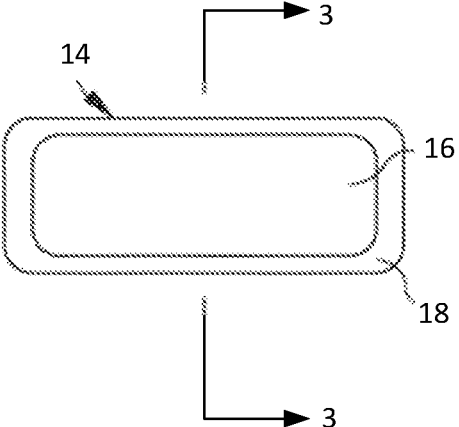
FIG. 2 illustrates a top view of the protective cover assembly from FIG. 1, according to some embodiments.

FIG. 2 illustrates a top view of the protective cover assembly 14 from FIG. 1, according to some embodiments. In the illustrated embodiment, the protective cover assembly 14 includes an active area 16 surrounded by a supported area 18. The active area 16 includes the membrane only and allows sound to pass readily therethrough. The supported area 18 includes the membrane sandwiched between external adhesive layers for connecting the protective cover assembly 14 with the electronic device 10. The particular structure for securing the membrane in place is not intended to be limiting.

Figure 3:
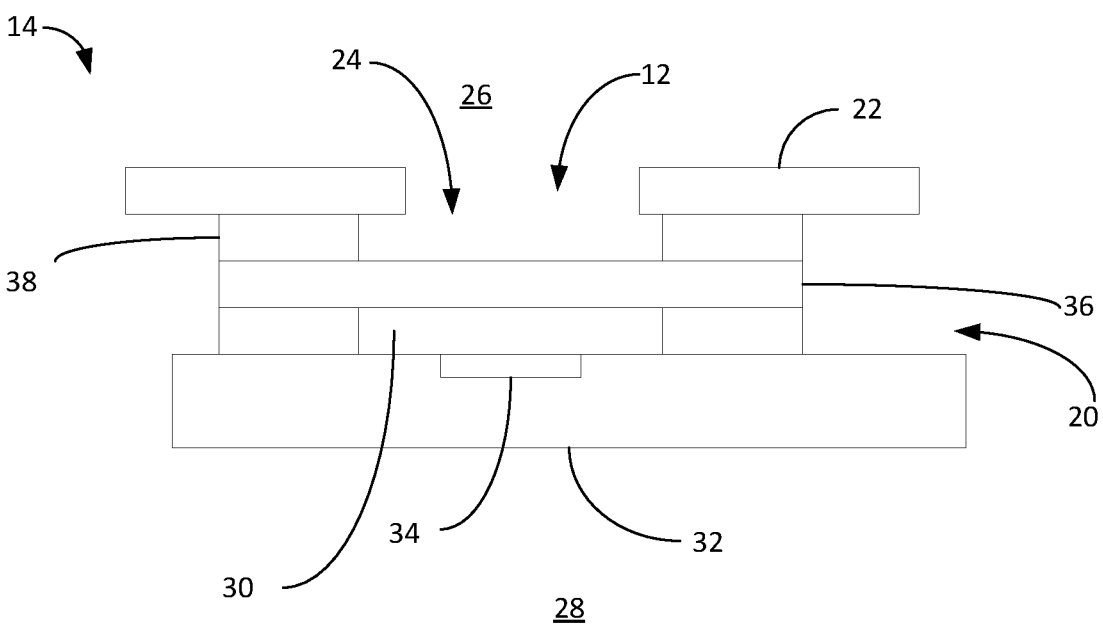
FIG. 3 illustrates a sectional view of the protective cover assembly of FIGS. 1-2, according to some embodiments.

FIG. 3 shows a cross-sectional view of the protective cover assembly 14, according to some embodiments. A layered assembly 20 is inserted in a casing 22 of the electronic device 10. The opening 12 defines an acoustic pathway 24, across which the protective cover assembly 14 is placed, separating an exterior environment 26 from an interior environment 28 of the casing 22, and separating exterior environment 26 from an acoustic cavity 30. The casing 22 is arranged around and configured to protect electronics 32 (e.g. a circuit board or the like for a mobile device, mobile phone, tablet, etc.), with the layered assembly 20 placed to prevent water or debris entry into the interior environment 28 and particularly to protect a transducer 34. The transducer 34 is positioned beneath the active area 16 within the opening 12 for generating or receiving sound.

The layered assembly 20 includes a membrane 36 and support structure 38. Acoustic waves may be passed through the acoustic cavity 30 and through the membrane 36 between the transducer 34 and the exterior environment 26 along the acoustic pathway 24. The acoustic pathway 24 is generally defined by the opening 12 in the casing 22. This opening 12 is generally approximately the same size as an unobstructed portion of the membrane 36.

The acoustic pathway 24 may also provide venting. Venting can provide for pressure equalization between the acoustic cavity 30 and the exterior environment 26. Venting is useful when pressure differences arise between the acoustic cavity 30 and exterior environment 26 that affect the ability of the layered assembly 20 to pass acoustic waves. For example, a temperature change in the acoustic cavity 30 may cause an expansion or contraction of air within the acoustic cavity, which would tend to deform the layered assembly 20 and cause acoustic distortion.

Surface Area Per Volume

In some embodiments, the polyethylene membrane has a surface area per volume of at least $39 \times 10^6$/m. In some embodiments, the surface area per volume is less than $70 \times 10^6$/m. In some embodiments, the polyethylene membrane has a surface area per volume of $39 \times 10^6$/m to $70 \times 10^6$/m.

In some embodiments, the polyethylene membrane has a surface area per volume of $40 \times 10^6$/m to $70 \times 10^6$/m. In some embodiments, the polyethylene membrane has a surface area per volume of $41 \times 10^6$/m to $70 \times 10^6$/m. In some embodiments, the polyethylene membrane has a surface area per volume of $42 \times 10^6$/m to $70 \times 10^6$/m. In some embodiments, the polyethylene membrane has a surface area per volume of $43 \times 10^6$/m to $70 \times 10^6$/m. In some embodiments, the polyethylene membrane has a surface area per volume of $44 \times 10^6$/m to $70 \times 10^6$/m. In some embodiments, the polyethylene membrane has a surface area per volume of $45 \times 10^6$/m to $70 \times 10^6$/m. In some embodiments, the polyethylene membrane has a surface area per volume of $46 \times 10^6$/m to $70 \times 10^6$/m. In some embodiments, the polyethylene membrane has a surface area per volume of $47 \times 10^6$/m to $70 \times 10^6$/m. In some embodiments, the polyethylene membrane has a surface area per volume of $48 \times 10^6$/m to $70 \times 10^6$/m. In some embodiments, the polyethylene membrane has a surface area per volume of $49 \times 10^6$/m to $70 \times 10^6$/m. In some embodiments, the polyethylene membrane has a surface area per volume of $50 \times 10^6$/m to $70 \times 10^6$/m. In some embodiments, the polyethylene membrane has a surface area per volume of $51 \times 10^6$/m to $70 \times 10^6$/m. In some embodiments, the polyethylene membrane has a surface area per volume of $52 \times 10^6$/m to $70 \times 10^6$/m. In some embodiments, the polyethylene membrane has a surface area per volume of $53 \times 10^6$/m to $70 \times 10^6$/m. In some embodiments, the polyethylene membrane has a surface area per volume of $54 \times 10^6$/m to $70 \times 10^6$/m. In some embodiments, the polyethylene membrane has a surface area per volume of $55 \times 10^6$/m to $70 \times 10^6$/m. In some embodiments, the polyethylene membrane has a surface area per volume of $56 \times 10^6$/m to $70 \times 10^6$/m. In some embodiments, the polyethylene membrane has a surface area per volume of $57 \times 10^6$/m to $70 \times 10^6$/m. In some embodiments, the polyethylene membrane has a surface area per volume of $58 \times 10^6$/m to $70 \times 10^6$/m. In some embodiments, the polyethylene membrane has a surface area per volume of $59 \times 10^6$/m to $70 \times 10^6$/m. In some embodiments, the polyethylene membrane has a surface area per volume of $60 \times 10^6$/m to $70 \times 10^6$/m. In some embodiments, the polyethylene membrane has a surface area per volume of $61 \times 10^6$/m to $70 \times 10^6$/m. In some embodiments, the polyethylene membrane has a surface area per volume of $62 \times 10^6$/m to $70 \times 10^6$/m. In some embodiments, the polyethylene membrane has a surface area per volume of $63 \times 10^6$/m to $70 \times 10^6$/m. In some embodiments, the polyethylene membrane has a surface area per volume of $64 \times 10^6$/m to $70 \times 10^6$/m. In some embodiments, the polyethylene membrane has a surface area per volume of $65 \times 10^6$/m to $70 \times 10^6$/m. In some embodiments, the polyethylene membrane has a surface area per volume of $66 \times 10^6$/m to $70 \times 10^6$/m. In some embodiments, the polyethylene membrane has a surface area per volume of $67 \times 10^6$/m to $70 \times 10^6$/m. In some embodiments, the polyethylene membrane has a surface area per volume of $68 \times 10^6$/m to $70 \times 10^6$/m. In some embodiments, the polyethylene membrane has a surface area per volume of $69 \times 10^6$/m to $70 \times 10^6$/m.

In some embodiments, the polyethylene membrane has a surface area per volume of $39 \times 10^6$/m to $69 \times 10^6$/m. In some embodiments, the polyethylene membrane has a surface area per volume of $39 \times 10^6$/m to $68 \times 10^6$/m. In some embodiments, the polyethylene membrane has a surface area per volume of $39 \times 10^6$/m to $67 \times 10^6$/m. In some embodiments, the polyethylene membrane has a surface area per volume of $39 \times 10^6$/m to $66 \times 10^6$/m. In some embodiments, the polyethylene membrane has a surface area per volume of $39 \times 10^6$/m to $65 \times 10^6$/m. In some embodiments, the polyethylene membrane has a surface area per volume of $39 \times 10^6$/m to $64 \times 10^6$/m. In some embodiments, the polyethylene membrane has a surface area per volume of $39 \times 10^6$/m to $63 \times 10^6$/m. In some embodiments, the polyethylene membrane has a surface area per volume of $39 \times 10^6$/m to $62 \times 10^6$/m. In some embodiments, the polyethylene membrane has a surface area per volume of $39 \times 10^6$/m to $61 \times 10^6$/m. In some embodiments, the polyethylene membrane has a surface area per volume of $39 \times 10^6$/m to $60 \times 10^6$/m. In some embodiments, the polyethylene membrane has a surface area per volume of $39 \times 10^6$/m to $59 \times 10^6$/m. In some embodiments, the polyethylene membrane has a surface area per volume of $39 \times 10^6$/m to $58 \times 10^6$/m. In some embodiments, the polyethylene membrane has a surface area per volume of $39 \times 10^6$/m to $57 \times 10^6$/m. In some embodiments, the polyethylene membrane has a surface area per volume of $39 \times 10^6$/m to $56 \times 10^6$/m. In some embodiments, the polyethylene membrane has a surface area per volume of $39 \times 10^6$/m to $55 \times 10^6$/m. In some embodiments, the polyethylene membrane has a surface area per volume of $39 \times 10^6$/m to $54 \times 10^6$/m. In some embodiments, the polyethylene membrane has a surface area per volume of $39 \times 10^6$/m to $53 \times 10^6$/m. In some embodiments, the polyethylene membrane has a surface area per volume of $39 \times 10^6$/m to $52 \times 10^6$/m. In some embodiments, the polyethylene membrane has a surface area per volume of $39\times10^6$/m to $51\times10^6$/m. In some embodiments, the polyethylene membrane has a surface area per volume of $39\times10^6$/m to $50\times10^6$/m. In some embodiments, the polyethylene membrane has a surface area per volume of $39\times10^6$/m to $49\times10^6$/m. In some embodiments, the polyethylene membrane has a surface area per volume of $39\times10^6$/m to $48\times10^6$/m. In some embodiments, the polyethylene membrane has a surface area per volume of $39\times10^6$/m to $47\times10^6$/m. In some embodiments, the polyethylene membrane has a surface area per volume of $39\times10^6$/m to $46\times10^6$/m. In some embodiments, the polyethylene membrane has a surface area per volume of $39\times10^6$/m to $45\times10^6$/m. In some embodiments, the polyethylene membrane has a surface area per volume of $39\times10^6$/m to $44\times10^6$/m. In some embodiments, the polyethylene membrane has a surface area per volume of $39\times10^6$/m to $43\times10^6$/m. In some embodiments, the polyethylene membrane has a surface area per volume of $39\times10^6$/m to $42\times10^6$/m. In some embodiments, the polyethylene membrane has a surface area per volume of $39\times10^6$/m to $41\times10^6$/m. In some embodiments, the polyethylene membrane has a surface area per volume of $39\times10^6$/m to $40\times10^6$/m.

Geometric Mean Tensile Modulus

In some embodiments, the polyethylene membrane has a geometric mean tensile modulus of 250 MPa to 750 MPa. In some embodiments, the geometric mean tensile modulus is from 300 MPa to 750 MPa. In some embodiments, the geometric mean tensile modulus is from 350 MPa to 750 MPa. In some embodiments, the geometric mean tensile modulus is from 400 MPa to 750 MPa. In some embodiments, the geometric mean tensile modulus is from 450 MPa to 750 MPa. In some embodiments, the geometric mean tensile modulus is from 500 MPa to 750 MPa. In some embodiments, the geometric mean tensile modulus is from 550 MPa to 750 MPa. In some embodiments, the geometric mean tensile modulus is from 600 MPa to 750 MPa. In some embodiments, the geometric mean tensile modulus is from 650 MPa to 750 MPa. In some embodiments, the geometric mean tensile modulus is from 700 MPa to 750 MPa.

In some embodiments, the geometric mean tensile modulus is from 250 MPa to 700 MPa. In some embodiments, the geometric mean tensile modulus is from 250 MPa to 650 MPa. In some embodiments, the geometric mean tensile modulus is from 250 MPa to 600 MPa. In some embodiments, the geometric mean tensile modulus is from 250 MPa to 550 MPa. In some embodiments, the geometric mean tensile modulus is from 250 MPa to 500 MPa. In some embodiments, the geometric mean tensile modulus is from 250 MPa to 450 MPa. In some embodiments, the geometric mean tensile modulus is from 250 MPa to 400 MPa. In some embodiments, the geometric mean tensile modulus is from 250 MPa to 350 MPa. In some embodiments, the geometric mean tensile modulus is from 250 MPa to 300 MPa.

In some embodiments, the geometric mean tensile modulus is from 350 MPa to 650 MPa.

Tensile Modulus Balance

In some embodiments, the polyethylene membrane has a tensile modulus balance of 1 to 2.1.

In some embodiments, the tensile modulus balance is 1.1 to 2.1. In some embodiments, the tensile modulus balance is 1.2 to 2.1. In some embodiments, the tensile modulus balance is 1.3 to 2.1. In some embodiments, the tensile modulus balance is 1.4 to 2.1. In some embodiments, the tensile modulus balance is 1.5 to 2.1. In some embodiments, the tensile modulus balance is 1.6 to 2.1. In some embodiments, the tensile modulus balance is 1.7 to 2.1. In some embodiments, the tensile modulus balance is 1.8 to 2.1. In some embodiments, the tensile modulus balance is 1.9 to 2.1. In some embodiments, the tensile modulus balance is 2 to 2.1.

In some embodiments, the tensile modulus balance is 1 to 2. In some embodiments, the tensile modulus balance is 1 to 1.9. In some embodiments, the tensile modulus balance is 1 to 1.8. In some embodiments, the tensile modulus balance is 1 to 1.7. In some embodiments, the tensile modulus balance is 1 to 1.6. In some embodiments, the tensile modulus balance is 1 to 1.5. In some embodiments, the tensile modulus balance is 1 to 1.4. In some embodiments, the tensile modulus balance is 1 to 1.3. In some embodiments, the tensile modulus balance is 1 to 1.2. In some embodiments, the tensile modulus balance is 1 to 1.1.

In some embodiments, the tensile modulus balance is less than 2.

Maximum Tensile Modulus

In some embodiments, the polyethylene membrane has a maximum tensile modulus in a first direction from 440 MPa to 915 MPa. In some embodiments, the tensile modulus in the first direction is from 440 MPa to 900 MPa. In some embodiments, the tensile modulus in the first direction is from 440 MPa to 850 MPa. In some embodiments, the tensile modulus in the first direction is from 440 MPa to 800 MPa. In some embodiments, the tensile modulus in the first direction is from 440 MPa to 750 MPa. In some embodiments, the tensile modulus in the first direction is from 440 MPa to 700 MPa. In some embodiments, the tensile modulus in the first direction is from 440 MPa to 650 MPa. In some embodiments, the tensile modulus in the first direction is from 440 MPa to 600 MPa. In some embodiments, the tensile modulus in the first direction is from 440 MPa to 550 MPa. In some embodiments, the tensile modulus in the first direction is from 440 MPa to 500 MPa. In some embodiments, the tensile modulus in the first direction is from 440 MPa to 450 MPa.

In some embodiments, the tensile modulus in the first direction is from 450 MPa to 915 MPa. In some embodiments, the tensile modulus in the first direction is from 500 MPa to 915 MPa. In some embodiments, the tensile modulus in the first direction is from 550 MPa to 915 MPa. In some embodiments, the tensile modulus in the first direction is from 600 MPa to 915 MPa. In some embodiments, the tensile modulus in the first direction is from 650 MPa to 915 MPa. In some embodiments, the tensile modulus in the first direction is from 700 MPa to 915 MPa. In some embodiments, the tensile modulus in the first direction is from 750 MPa to 915 MPa. In some embodiments, the tensile modulus in the first direction is from 800 MPa to 915 MPa. In some embodiments, the tensile modulus in the first direction is from 850 MPa to 915 MPa. In some embodiments, the tensile modulus in the first direction is from 900 MPa to 915 MPa.

In some embodiments, the polyethylene membrane has a maximum tensile modulus in a second direction that is orthogonal to the first direction from 275 MPa to 515 MPa. In some embodiments, the maximum tensile modulus in the second direction is from 275 MPa to 500 MPa. In some embodiments, the maximum tensile modulus in the second direction is from 275 MPa to 450 MPa. In some embodiments, the maximum tensile modulus in the second direction is from 275 MPa to 400 MPa. In some embodiments, the maximum tensile modulus in the second direction is from 275 MPa to 350 MPa. In some embodiments, the maximum tensile modulus in the second direction is from 275 MPa to 300 MPa.

In some embodiments, the maximum tensile modulus in the second direction is from 300 MPa to 515 MPa. In some embodiments, the maximum tensile modulus in the second direction is from 350 MPa to 515 MPa. In some embodiments, the maximum tensile modulus in the second direction is from 400 MPa to 515 MPa. In some embodiments, the maximum tensile modulus in the second direction is from 450 MPa to 515 MPa. In some embodiments, the maximum tensile modulus in the second direction is from 500 MPa to 515 MPa.

It is to be appreciated that the first and second directions can be reversed so long as the first and second direction are orthogonal to each other.

Thickness

In some embodiments, the polyethylene membrane has a thickness of 14 μm or less. In some embodiments, the thickness is at least 0.5 μm. In some embodiments, the thickness is from 0.5 μm to 14 μm.

In some embodiments, the thickness is from 1 μm to 14 μm. In some embodiments, the thickness is from 2 μm to 14 μm. In some embodiments, the thickness is from 3 μm to 14 μm. In some embodiments, the thickness is from 4 μm to 14 μm. In some embodiments, the thickness is from 5 μm to 14 μm. In some embodiments, the thickness is from 6 μm to 14 μm. In some embodiments, the thickness is from 7 μm to 14 μm. In some embodiments, the thickness is from 8 μm to 14 μm. In some embodiments, the thickness is from 9 μm to 14 μm. In some embodiments, the thickness is from 10 μm to 14 μm. In some embodiments, the thickness is from 11 μm to 14 μm. In some embodiments, the thickness is from 12 μm to 14 μm. In some embodiments, the thickness is from 13 μm to 14 μm.

In some embodiments, the thickness is from 0.5 μm to 13 μm. In some embodiments, the thickness is from 0.5 μm to 12 μm. In some embodiments, the thickness is from 0.5 μm to 11 μm. In some embodiments, the thickness is from 0.5 μm to 10 μm. In some embodiments, the thickness is from 0.5 μm to 9 μm. In some embodiments, the thickness is from 0.5 μm to 8 μm. In some embodiments, the thickness is from 0.5 μm to 7 μm. In some embodiments, the thickness is from 0.5 μm to 6 μm. In some embodiments, the thickness is from 0.5 μm to 5 μm. In some embodiments, the thickness is from 0.5 μm to 4 μm. In some embodiments, the thickness is from 0.5 μm to 3 μm. In some embodiments, the thickness is from 0.5 μm to 2 μm. In some embodiments, the thickness is from 0.5 μm to 1 μm.

Porosity

In some embodiments, the polyethylene membrane has a porosity of at least 50%. In some embodiments, the porosity is less than 95%. In some embodiments, the porosity is from 50% to 95%.

In some embodiments, the porosity is from 55% to 95%. In some embodiments, the porosity is from 60% to 95%. In some embodiments, the porosity is from 65% to 95%. In some embodiments, the porosity is from 75% to 95%. In some embodiments, the porosity is from 80% to 95%. In some embodiments, the porosity is from 85% to 95%. In some embodiments, the porosity is from 90% to 95%.

In some embodiments, the porosity is from 50% to 90%. In some embodiments, the porosity is from 50% to 85%. In some embodiments, the porosity is from 50% to 80%. In some embodiments, the porosity is from 50% to 75%. In some embodiments, the porosity is from 50% to 70%. In some embodiments, the porosity is from 50% to 65%. In some embodiments, the porosity is from 50% to 60%. In some embodiments, the porosity is from 50% to 55%. In some embodiments, the porosity is from 55% to 86%.

Recovery after Open Hole Challenge

In some embodiments, a % recovery at 1 hour after 1 bar open hole challenge is at least 69%. In some embodiments, the % recovery at 1 hour after 1 bar open hole challenge is 99% or less.

In some embodiments, the % recovery at 1 hour after 1 bar open hole challenge is 74% to 99%. In some embodiments, the % recovery at 1 hour after 1 bar open hole challenge is 79% to 99%. In some embodiments, the % recovery at 1 hour after 1 bar open hole challenge is 84% to 99%. In some embodiments, the % recovery at 1 hour after 1 bar open hole challenge is 89% to 99%. In some embodiments, the % recovery at 1 hour after 1 bar open hole challenge is 94% to 99%.

In some embodiments, the % recovery at 1 hour after 1 bar open hole challenge is 69% to 94%. In some embodiments, the % recovery at 1 hour after 1 bar open hole challenge is 69% to 89%. In some embodiments, the % recovery at 1 hour after 1 bar open hole challenge is 69% to 84%. In some embodiments, the % recovery at 1 hour after 1 bar open hole challenge is 69% to 79%. In some embodiments, the % recovery at 1 hour after 1 bar open hole challenge is 69% to 74%.

In some embodiments, the % recovery at 1 hour after 1 bar open hole challenge is 95% to 99%. In some embodiments, the % recovery at 1 hour after 1 bar open hole challenge is 96% to 99%. In some embodiments, the % recovery at 1 hour after 1 bar open hole challenge is 97% to 99%. In some embodiments, the % recovery at 1 hour after 1 bar open hole challenge is 98% to 99%.

In some embodiments, the % recovery at 1 hour after 1 bar open hole challenge is 94% to 98%. In some embodiments, the % recovery at 1 hour after 1 bar open hole challenge is 94% to 97%. In some embodiments, the % recovery at 1 hour after 1 bar open hole challenge is 94% to 96%. In some embodiments, the % recovery at 1 hour after 1 bar open hole challenge is 94% to 95%.

Bubble Point

In some embodiments, the polyethylene membrane has a bubble point of 7 psi to 200 psi. In some embodiments, the bubble point is 10 psi to 200 psi. In some embodiments, the bubble point is 15 psi to 200 psi. In some embodiments, the bubble point is 20 psi to 200 psi. In some embodiments, the bubble point is 25 psi to 200 psi. In some embodiments, the bubble point is 30 psi to 200 psi. In some embodiments, the bubble point is 35 psi to 200 psi. In some embodiments, the bubble point is 40 psi to 200 psi. In some embodiments, the bubble point is 45 psi to 200 psi. In some embodiments, the bubble point is 50 psi to 200 psi. In some embodiments, the bubble point is 55 psi to 200 psi. In some embodiments, the bubble point is 60 psi to 200 psi. In some embodiments, the bubble point is 65 psi to 200 psi. In some embodiments, the bubble point is 70 psi to 200 psi. In some embodiments, the bubble point is 75 psi to 200 psi. In some embodiments, the bubble point is 80 psi to 200 psi. In some embodiments, the bubble point is 85 psi to 200 psi. In some embodiments, the bubble point is 90 psi to 200 psi. In some embodiments, the bubble point is 95 psi to 200 psi. In some embodiments, the bubble point is 100 psi to 200 psi. In some embodiments, the bubble point is 105 psi to 200 psi. In some embodiments, the bubble point is 110 psi to 200 psi. In some embodiments, the bubble point is 115 psi to 200 psi. In some embodiments, the bubble point is 120 psi to 200 psi. In some embodiments, the bubble point is 125 psi to 200 psi. In some embodiments, the bubble point is 130 psi to 200 psi. In some embodiments, the bubble point is 135 psi to 200 psi. In some embodiments, the bubble point is 140 psi to 200 psi. In some embodiments, the bubble point is 145 psi to 200 psi. In some embodiments, the bubble point is 150 psi to 200 psi. In some embodiments, the bubble point is 155 psi to 200 psi. In some embodiments, the bubble point is 160 psi to 200 psi. In some embodiments, the bubble point is 165 psi to 200 psi. In some embodiments, the bubble point is 170 psi to 200 psi. In some embodiments, the bubble point is 175 psi to 200 psi. In some embodiments, the bubble point is 180 psi to 200 psi. In some embodiments, the bubble point is 185 psi to 200 psi. In some embodiments, the bubble point is 190 psi to 200 psi. In some embodiments, the bubble point is 195 psi to 200 psi.

In some embodiments, the bubble point is 7 psi to 195 psi. In some embodiments, the bubble point is 7 psi to 190 psi. In some embodiments, the bubble point is 7 psi to 185 psi. In some embodiments, the bubble point is 7 psi to 180 psi. In some embodiments, the bubble point is 7 psi to 175 psi. In some embodiments, the bubble point is 7 psi to 170 psi. In some embodiments, the bubble point is 7 psi to 165 psi. In some embodiments, the bubble point is 7 psi to 160 psi. In some embodiments, the bubble point is 7 psi to 155 psi. In some embodiments, the bubble point is 7 psi to 150 psi. In some embodiments, the bubble point is 7 psi to 145 psi. In some embodiments, the bubble point is 7 psi to 140 psi. In some embodiments, the bubble point is 7 psi to 135 psi. In some embodiments, the bubble point is 7 psi to 130 psi. In some embodiments, the bubble point is 7 psi to 125 psi. In some embodiments, the bubble point is 7 psi to 120 psi. In some embodiments, the bubble point is 7 psi to 115 psi. In some embodiments, the bubble point is 7 psi to 110 psi. In some embodiments, the bubble point is 7 psi to 105 psi. In some embodiments, the bubble point is 7 psi to 100 psi. In some embodiments, the bubble point is 7 psi to 95 psi. In some embodiments, the bubble point is 7 psi to 90 psi. In some embodiments, the bubble point is 7 psi to 85 psi. In some embodiments, the bubble point is 7 psi to 80 psi. In some embodiments, the bubble point is 7 psi to 75 psi. In some embodiments, the bubble point is 7 psi to 70 psi. In some embodiments, the bubble point is 7 psi to 65 psi. In some embodiments, the bubble point is 7 psi to 60 psi. In some embodiments, the bubble point is 7 psi to 55 psi. In some embodiments, the bubble point is 7 psi to 50 psi. In some embodiments, the bubble point is 7 psi to 45 psi. In some embodiments, the bubble point is 7 psi to 40 psi. In some embodiments, the bubble point is 7 psi to 35 psi. In some embodiments, the bubble point is 7 psi to 30 psi. In some embodiments, the bubble point is 7 psi to 25 psi. In some embodiments, the bubble point is 7 psi to 20 psi. In some embodiments, the bubble point is 7 psi to 15 psi. In some embodiments, the bubble point is 7 psi to 10 psi.

Permeability

In some embodiments, the polyethylene membrane has a permeability from $3\times10^{-16}$ m$^2$ to $7.4\times10^{-15}$ m$^2$. In some embodiments, the permeability is from $3\times10^{-16}$ m$^2$ to $7\times10^{-15}$ m$^2$. In some embodiments, the permeability is from $3\times10^{-16}$ m$^2$ to $6\times10^{-15}$ m$^2$. In some embodiments, the permeability is from $3\times10^{-16}$ m$^2$ to $5\times10^{-15}$ m$^2$. In some embodiments, the permeability is from $3\times10^{-16}$ m$^2$ to $4\times10^{-15}$ m$^2$. In some embodiments, the permeability is from $3\times10^{-16}$ m$^2$ to $3\times10^{-15}$ m$^2$. In some embodiments, the permeability is from $3\times10^{-16}$ m$^2$ to $2\times10^{-15}$ m$^2$. In some embodiments, the permeability is from $3\times10^{-16}$ m$^2$ to $1\times10^{-15}$ m$^2$. In some embodiments, the permeability is from $3\times10^{-16}$ m$^2$ to $9\times10^{-16}$ m$^2$. In some embodiments, the permeability is from $3\times10^{-16}$ m$^2$ to $8\times10^{-16}$ m$^2$. In some embodiments, the permeability is from $3\times10^{-16}$ m$^2$ to $7\times10^{-16}$ m$^2$. In some embodiments, the permeability is from $3\times10^{-16}$ m$^2$ to $6\times10^{-16}$ m$^2$. In some embodiments, the permeability is from $3\times10^{-16}$ m$^2$ to $5\times10^{-16}$ m$^2$. In some embodiments, the permeability is from $3\times10^{-16}$ m$^2$ to $4\times10^{-16}$ m$^2$.

In some embodiments, the permeability is from $4\times10^{-16}$ m$^2$ to $7.4\times10^{-15}$ m$^2$. In some embodiments, the permeability is from $5\times10^{-16}$ m$^2$ to $7.4\times10^{-15}$ m$^2$. In some embodiments, the permeability is from $6\times10^{-16}$ m$^2$ to $7.4\times10^{-15}$ m$^2$. In some embodiments, the permeability is from $7\times10^{-16}$ m$^2$ to $7.4\times10^{-15}$ m$^2$. In some embodiments, the permeability is from $8\times10^{-16}$ m$^2$ to $7.4\times10^{-15}$ m$^2$. In some embodiments, the permeability is from $9\times10^{-16}$ m$^2$ to $7.4\times10^{-15}$ m$^2$. In some embodiments, the permeability is from $1\times10^{-15}$ m$^2$ to $7.4\times10^{-15}$ m$^2$. In some embodiments, the permeability is from $2\times10^{-15}$ m$^2$ to $7.4\times10^{-15}$ m$^2$. In some embodiments, the permeability is from $3\times10^{-15}$ m$^2$ to $7.4\times10^{-15}$ m$^2$. In some embodiments, the permeability is from $4\times10^{-15}$ m$^2$ to $7.4\times10^{-15}$ m$^2$. In some embodiments, the permeability is from $5\times10^{-15}$ m$^2$ to $7.4\times10^{-15}$ m$^2$. In some embodiments, the permeability is from $6\times10^{-15}$ m$^2$ to $7.4\times10^{-15}$ m$^2$. In some embodiments, the permeability is from $7\times10^{-15}$ m$^2$ to $7.4\times10^{-15}$ m$^2$.

In some embodiments, the permeability is from $1.0\times10^{-15}$ m$^2$ to $8.0\times10^{-15}$ m$^2$. In some embodiments, the permeability is from $2.0\times10^{-15}$ m$^2$ to $8.0\times10^{-15}$ m$^2$. In some embodiments, the permeability is from $3.0\times10^{-15}$ m$^2$ to $8.0\times10^{-15}$ m$^2$. In some embodiments, the permeability is from $4.0\times10^{-15}$ m$^2$ to $8.0\times10^{-15}$ m$^2$. In some embodiments, the permeability is from $5.0\times10^{-15}$ m$^2$ to $8.0\times10^{-15}$ m$^2$. In some embodiments, the permeability is from $6.0\times10^{-15}$ m$^2$ to $8.0\times10^{-15}$ m$^2$. In some embodiments, the permeability is from $7.0\times10^{-15}$ m$^2$ to $8.0\times10^{-15}$ m$^2$.

In some embodiments, the permeability is from $1.0\times10^{-15}$ m$^2$ to $7.0\times10^{-15}$ m$^2$. In some embodiments, the permeability is from $1.0\times10^{-15}$ m$^2$ to $6.0\times10^{-15}$ m$^2$. In some embodiments, the permeability is from $1.0\times10^{-15}$ m$^2$ to $5.0\times10^{-15}$ m$^2$. In some embodiments, the permeability is from $1.0\times10^{-15}$ m$^2$ to $4.0\times10^{-15}$ m$^2$. In some embodiments, the permeability is from $1.0\times10^{-15}$ m$^2$ to $3.0\times10^{-15}$ m$^2$. In some embodiments, the permeability is from $1.0\times10^{-15}$ m$^2$ to $2.0\times10^{-15}$ m$^2$.

Transmission Loss @ 10 KHz

In some embodiments, the acoustic device has a transmission loss (dB) that varies (i.e., change in transmission loss, $\Delta$TL (dB)) by less than 2.1 dB when tested using a WEP test at 24 hours after 1 bar open hole challenge @ 10 KHz. In some embodiments, the transmission loss (dB) varies by less than 2 dB. In some embodiments, the transmission loss (dB) varies by less than 1.9 dB. In some embodiments, the transmission loss (dB) varies by less than 1.8 dB. In some embodiments, the transmission loss (dB) varies by less than 1.7 dB. In some embodiments, the transmission loss (dB) varies by less than 1.6 dB. In some embodiments, the transmission loss (dB) varies by less than 1.5 dB. In some embodiments, the transmission loss (dB) varies by less than 1.4 dB. In some embodiments, the transmission loss (dB) varies by less than 1.3 dB. In some embodiments, the transmission loss (dB) varies by less than 1.2 dB. In some embodiments, the transmission loss (dB) varies by less than 1.1 dB. In some embodiments, the transmission loss (dB) varies by less than 1 dB. In some embodiments, the transmission loss (dB) varies by less than 0.9 dB. In some embodiments, the transmission loss (dB) varies by less than 0.8 dB. In some embodiments, the transmission loss (dB) varies by less than 0.7 dB. In some embodiments, the transmission loss (dB) varies by less than 0.6 dB. In some embodiments, the transmission loss (dB) varies by less than 0.5 dB. In some embodiments, the transmission loss (dB)

varies by less than 0.4 dB. In some embodiments, the transmission loss (dB) varies by less than 0.3 dB. In some embodiments, the transmission loss (dB) varies by less than 0.2 dB.

Transmission Loss @ 3 KHz

In some embodiments, the acoustic device has a transmission loss (dB) that varies (i.e., change in transmission loss, ΔTL (dB)) by less than 2.1 dB when tested using a WEP test at 24 hours after 1 bar open hole challenge @ 3 KHz. In some embodiments, the transmission loss (dB) varies by less than 2 dB. In some embodiments, the transmission loss (dB) varies by less than 1.9 dB. In some embodiments, the transmission loss (dB) varies by less than 1.8 dB. In some embodiments, the transmission loss (dB) varies by less than 1.7 dB. In some embodiments, the transmission loss (dB) varies by less than 1.6 dB. In some embodiments, the transmission loss (dB) varies by less than 1.5 dB. In some embodiments, the transmission loss (dB) varies by less than 1.4 dB. In some embodiments, the transmission loss (dB) varies by less than 1.3 dB. In some embodiments, the transmission loss (dB) varies by less than 1.2 dB. In some embodiments, the transmission loss (dB) varies by less than 1.1 dB. In some embodiments, the transmission loss (dB) varies by less than 1 dB. In some embodiments, the transmission loss (dB) varies by less than 0.9 dB. In some embodiments, the transmission loss (dB) varies by less than 0.8 dB. In some embodiments, the transmission loss (dB) varies by less than 0.7 dB. In some embodiments, the transmission loss (dB) varies by less than 0.6 dB. In some embodiments, the transmission loss (dB) varies by less than 0.5 dB. In some embodiments, the transmission loss (dB) varies by less than 0.4 dB. In some embodiments, the transmission loss (dB) varies by less than 0.3 dB. In some embodiments, the transmission loss (dB) varies by less than 0.2 dB.

Transmission Loss @ 1 KHz

In some embodiments, the acoustic device has a transmission loss (dB) that varies (i.e., change in transmission loss, ΔTL (dB)) by less than 2 dB when tested using a WEP test at 24 hours after 1 bar open hole challenge @ 1 KHz. In some embodiments, the transmission loss (dB) varies by less than 1.9 dB. In some embodiments, the transmission loss (dB) varies by less than 1.8 dB. In some embodiments, the transmission loss (dB) varies by less than 1.7 dB. In some embodiments, the transmission loss (dB) varies by less than 1.6 dB. In some embodiments, the transmission loss (dB) varies by less than 1.5 dB. In some embodiments, the transmission loss (dB) varies by less than 1.4 dB. In some embodiments, the transmission loss (dB) varies by less than 1.3 dB. In some embodiments, the transmission loss (dB) varies by less than 1.2 dB. In some embodiments, the transmission loss (dB) varies by less than 1.1 dB. In some embodiments, the transmission loss (dB) varies by less than 1 dB. In some embodiments, the transmission loss (dB) varies by less than 0.9 dB. In some embodiments, the transmission loss (dB) varies by less than 0.8 dB. In some embodiments, the transmission loss (dB) varies by less than 0.7 dB. In some embodiments, the transmission loss (dB) varies by less than 0.6 dB. In some embodiments, the transmission loss (dB) varies by less than 0.5 dB. In some embodiments, the transmission loss (dB) varies by less than 0.4 dB. In some embodiments, the transmission loss (dB) varies by less than 0.3 dB. In some embodiments, the transmission loss (dB) varies by less than 0.2 dB.

Test Procedures

The following test procedures were used to generate the data in the "Non-Limiting Examples" section. The test procedures herein are not intended to be limiting.

Average Surface Area Per Volume:

The surface area per unit mass (SSA), expressed in units of m²/g, of the polyethylene membrane was first measured using the Brunauer-Emmett-Teller (BET) method on a Quantachrome NOVAtouch LX4 Gas Sorption System (Quantachrome Instruments-Anton Paar-Boynton Beach, FL). A sample was cut from the center of the polyethylene membrane sheet and placed into a Type B long cell, 9 mm LG bulb (reference number 193885). The mass of the polyethylene membrane sample was approximately 0.1 to 0.2 grams. The tube was placed into the Coulter SA-Prep Surface Area Outgasser, (Model SA-PREP, P/N 5102014) from Beckman Coulter Inc., Fullerton, CA and purged at room temperature for 2 hours with helium. The sample tube was then removed from the SA-Prep Outgasser and weighed. A glass filler rod (reference number 193900) was placed in the cell and the assembly was then placed into the NOVAtouch LX4 Gas Sorption System and the BET surface area analysis was run in accordance with the instrument instructions using helium to calculate the free space and nitrogen as the adsorbate gas. A single BET surface area (m²/g) measurement was recorded for each sample.

Specific surface area (SSA) can be converted to surface area per volume (Sv) using the following calculation:

$$Sv = \rho(\text{polymer}) * SSA[10^6/\text{m}]$$

where:

$$\rho(\text{polymer}) = 0.94 \text{ g/cc}$$

$$SSA = \text{specific surface area}[\text{m}^2/\text{g}]$$

Porosity:

Samples were die cut to form circular sections of 5.64 cm radius (area=100 cm²). Each sample was weighed using a Mettler Toledo Analytical balance. Using the thickness calculated by the KEYENCE laser (see explanation below), the bulk density of the samples was calculated using the following formula:

$$\rho = \frac{m}{n * r^2 * t}$$

where:

$$\rho(\text{bulk}) = \text{density}(\text{g/cc})$$

$$m = \text{mass}(\text{g})$$

$$r = \text{circle cut radius}(5.64 \text{ cm})$$

$$t = \text{thickness}(\text{cm}).$$

The skeletal density is the density of a solid calculated by excluding all open pores, but including internal (or blind) pore volume. The density of polyethylene was assumed to be ρ (polymer)=0.94 g/cc.

Thus, the membrane porosity or total porosity within the substrate is simply the void volume of the sample divided by the total volume of the sample. The membrane porosity can be calculated by the following formula:

$$\% \text{ Porosity} = 100\% * \{1 - \rho(\text{bulk})/\rho(\text{skeleton})\}$$

Permeability:

The ATEQ airflow test measures laminar volumetric flow rates of air through membrane samples. Each membrane sample was clamped between two plates in a manner that seals an area of 2.99 cm$^2$ across the flow pathway. An ATEQ® (ATEQ Corp., Livonia, MI) Premier D Compact Flow Tester was used to measure airflow rate (L/hr) through each membrane sample by challenging it with a differential air pressure of 1.2 kPa (12 mbar) through the membrane. The instrument was operated with calibrated 30 and 150 L flow tubes for making airflow measurements within the ranges of 0.5 to 30 L/hr and 3.8 to 150 L/hr, respectively.

The Darcy permeability of air at room temperature can be calculated as following for ATEQ measured values at 12 mbar:

$$\text{Permeability}(m^2) = 2.073 \times 10^{-17} * ATEQ * t$$

where:

ATEQ [@ 12 mbar] (L/h)

t=thickness (μm).

Thickness:

The non-contact thickness of the membranes was measured using a KEYENCE LS-7600 laser system (commercially available from KEYENCE America). The optical measurement is made by gently placing the sample membrane against a polished stainless cylinder having a 1 inch diameter and smoothing it down with minimal applied tension. The thickness of the sample is determined by measurement of the shadow created in the parallel light path of within the two ends of the Keyence laser micrometer. The average of the three measurements was utilized.

Bubble Point:

Liquids with surface free energies less than that of stretched porous polyethylene can be forced out of the structure with the application of a differential pressure. This clearing will occur from the largest passageways first. A passageway is then created through which bulk nitrogen flow can take place. The nitrogen flow appears as a steady stream of small bubbles through the liquid layer on top of the sample. The pressure at which the first bulk air flow takes place is called the bubble point and is dependent on the surface tension of the test fluid and the size of the largest opening. The bubble point can be used as a relative measure of the structure of a membrane and is often correlated with some other type of performance criteria, such as filtration efficiency.

The bubble point was measured according to the general teachings of ASTM F316-03 using a Capillary Flow Porometer (Model 3 G zh from Quantachrome Instruments). The sample holder comprised a porous metal plate (Part Number: 196450, Anton Paar), 25.4 mm in diameter and a plastic mask (Part Number ABF-300, Professional Plastics), 18 mm inner diameter×24.5 mm outer diameter. The sample was placed in between the metal plate and the plastic mask. The sample was then clamped down and sealed using an O-ring (Part Number: 193798, Anton Paar). The sample was wet with the test fluid (Silicone fluid, 10 cSt, having a surface tension of 19.75 dynes/cm).

Transmission Loss:

Transmission loss and phase angle testing were performed by the Impedance Tube Transfer Matrix Test ("ITTMT"), which is a modified version of ASTM-E2611-09—the standard test method for measuring normal incidence sound transmission loss and phase based on the 4 microphone transfer matrix method. All modifications to ASTM-E2611-09 are set forth herein. The transfer matrix of the assembly was measured, and we use T12 element of the transfer matrix as the acoustic impedance value for all the assemblies described in the examples.

An impedance tube was used to make measurements across a frequency range of 500 Hz to 20,000 Hz. The inner diameter of the tube was 8 mm. The impedance tube was designed in accordance with ASTM E1050-12 and ASTM E2611-09.A JBL 2426H compression driver was mounted at one end of the tube and powered by a Bruel and Kjaer Type 2735 amplifier connected to a 31-band ART 351 graphic equalizer. The measurement system used 4 Bruel and Kjaer Type 4138 microphones connected to a 4 channel Bruel and Kjaer Type 3160-A-042 LAN-XI Frontend with a generator output. Data was acquired and processed using Bruel and Kjaer PULSE Labshop with Type 7758 Acoustic Material Testing Software, version 21.

The sample assemblies that were tested had an inner diameter of 1.5 mm, which was smaller than the inner diameter of the impedance tube. A pair of conical adapters was therefore required in order to mount the sample assemblies. The convergent cone had an inlet diameter of 8 mm and an outlet diameter of 1.5 mm. The divergent cone had an inlet diameter of 1.5 mm and an outlet diameter of 8 mm.

When using conical adapters, additional processing of the data was required to account for the converging geometry of the cones. Theoretical equations were derived to calculate the transfer matrices of the conical adapters and can be found in the literature (Hua, X. and Herrin, D., "Practical Considerations when using the Two-Load Method to Determine the Transmission Loss of Mufflers and Silencers," *SAE Int. J. Passeng. Cars—Mech. Syst.* 6(2): 1094-1101, 2013 & Mechel, F. P. (2008). Formulas of Acoustics. New York, NY: Springer).

Maximum Tensile Modulus:

To determine the maximum tensile modulus, a sample polyethylene membrane was cut in the longitudinal and transverse directions using an ASTM D412 Type F Die (D412F). Tensile load as a function of displacement was measured using an INSTRON® 5565 (Illinois Tool Works Inc., Norwood, MA) tensile test machine equipped with flat-faced grips and a 100 N load cell. The grip separation distance was set to 8.26 cm and using an ASTM defined gage length of 5.89 cm, a strain rate of 0.847 cm/s or 14.4%/s was used. A data point was captured every 20 ms. After placing the sample in the grips, the sample was retracted 1.27 cm (introducing slack into the specimen), and then the test was continued at the previously prescribed strain rate. As the slack of the sample was recovered, the load cell registered a baseline zero force with some degree of noise in the signal, which was quantified with a calculation of its standard deviation. Three samples for each condition were tested individually samples in each orthogonal (e.g., longitudinal and transverse) direction. In each test, the maximum tensile modulus was determined using a maximum linear fit as further described below and their respective averages were reported.

The maximum linear fit was determined by importing the raw data from the tensile test machine into a data analysis program.

The 0 strain point for each sample was established as follows. At each data point in the tensile test, it was determined whether the load exceeded two times the standard deviation of the baseline zero force measurement. When a string of five data points met that criteria, it is determined that the sample has become stressed. The last data point before this string of data points is established as the 0 strain point.

The tensile modulus is the gradient of a plot of stress/strain. Starting at the 0 strain point the tensile modulus was calculated by making a series of linear fits of stress versus strain for sequential groups of every five data points collected by the tensile test machine. The specific group of sequential data having the linear fit of maximum gradient was selected as the maximum tensile modulus. Three samples in each orthogonal (e.g. longitudinal and transverse) direction were tested and their respective averages were reported. The larger of the two average maximum tensile moduli determined for the two orthogonal directions was assigned that of the first direction. The smaller of the two average maximum tensile moduli determined for the two orthogonal directions was assigned that of the second direction.

Geometric Mean Modulus:

The geometric mean of the maximum tensile modulus determined by the maximum linear fit discussed above for each membrane was then calculated using the following equation:

Geometric Mean Modulus=Square Root{(longitudinal Maximum Tensile Modulus)*(transverse Maximum Tensile Modulus)}.

Balance Ratio of the Maximum Tensile Moduli

The balance ratio of the maximum tensile moduli was calculated using the following equation:

Modulus Balance Ratio=(Absolute maximum value of maximum modulus in a single direction)/(value of maximum modulus a direction orthogonal to the direction with the maximum Max Modulus).

Transmission Loss Testing Before and after Pressure Testing:

Sample assemblies were subjected to the following Pressure Test procedure. The purpose of this test was to replicate the pressure exerted on a membrane assembly in a device that was submerged in a given depth of water for a given duration of time. A transmission loss was measured before the pressure test and then remeasured 24 hours after the pressure test. The change in transmission loss (dB), due to the pressure test, was calculated by subtracting the pre-test transmission loss from the post-test transmission loss.

Biaxial Pressure Test

The biaxial, out of plane, displacement of the membranes that results from stress of air or water pressure was based on the test method described in ASTM D3786/D3786M-13 Bursting Strength of Textile Fabrics with an added single point laser (Keyence CCD laser displacement sensor LK-G32) to track the vertical deflection at the center of the membrane. To measure displacement of the membranes under applied challenge pressures, flat sheets of composites were inserted into a FR4-membrane-FR4 coupon sandwich with a 1.6 mm diameter orifice using a pressure sensitive adhesive (Tesa® 4983) and the entire assembly held in place in a metal fixture with a metal top plate having a 1.6 mm orifice, where the top plate was clamped down with screws. The metal fixture was connected to a pressure vessel containing air. The pressure vessel was connected to a control box with programmable features that enable pressure ramp and pressure control of air. The control box was programmed to ramp the incoming pressure at 1.0 psi per second ramp rate until a maximum pressure of 14.5 psi was reached. This target pressure (e.g., 14.5 psi) represents a 10-meter water immersion depth rating that is an industry standard. The samples were held at the target pressure for a 30-minute duration and then the pressure is removed for an additional 60 min. The single point laser is centered over the material during the protocol to assess out of plane displacement both during the 30 minute pressurization phase at 14.5 psi and to 60 min recovery phase after the pressure is removed from the test sample. The ratio of the value of membrane deflection at the center point at the end of the 60 min relaxation phase relative to the value of the maximum deflection reached under pressurization is defined as the % elastic recovery.

Figure 4:
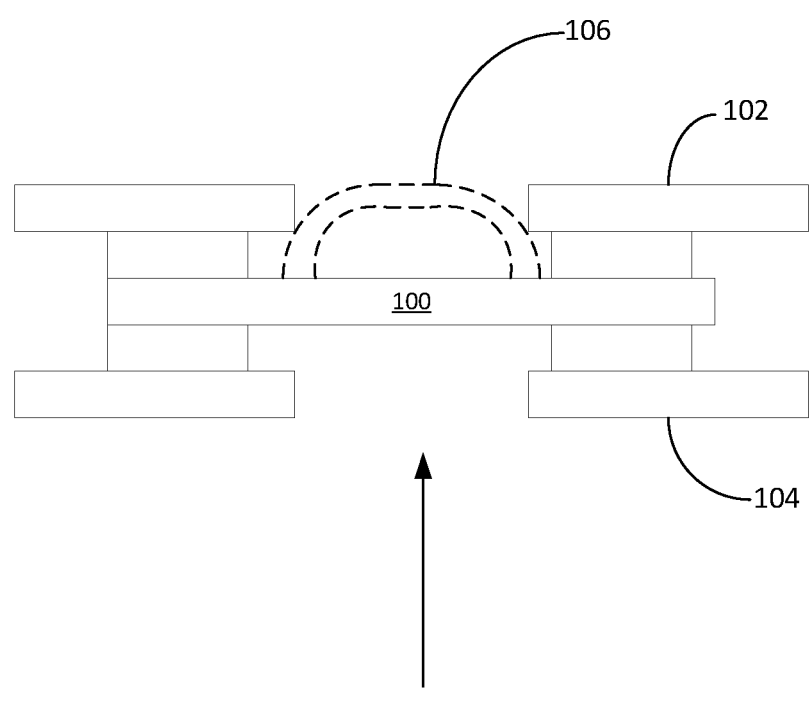
FIG. 4 illustrates a schematic of a test configuration for a pressure test, according to some embodiments.

FIG. 4 illustrates an example setup for a pressure test. A "Pressure Test" can be performed by placing a sample membrane 100 between two rigid supports 102, 104. A pressure, either air or water, at a selected level can then be applied to the membrane. A center height of the dome 106 caused by the applied pressure can be measured such as, for example, using a Keyence laser displacement gauge. For example, the pressure test can include a 1 bar air or water pressure applied to the membrane 100 for a period of 30 minutes. After the time period is complete, the pressure is no longer applied and the membrane 100 allowed to return to its original state.

NON-LIMITING EXAMPLES

One method to produce porous polyethylene membranes is through a wet or gel process. In this process, polyethylene is mixed with a hydrocarbon liquid and other additives. This mixture is heated over the polymer melt and extruded into a sheet. This sheet can then be orientated biaxially before and/or after the hydrocarbon liquid is extracted, producing a microporous membrane. Various process details are known, such as in U.S. Pat. Nos. 5,248,461; 4,873,034; 5,051,183; and 6,566,012; each of which are hereby incorporated-by-reference in their entirety. Additional discussion includes Casting and stretching of filled and unfilled UHMW-polyethylene films, Ir. F. H. Assinck, Centre for polymers and composites, Eindhoven University of Technology, November 1995) and (Porous Biaxially, drawn UHMWPE Films, H. M. Fortuin, DSM Research BV, Department of Materials Technology-Fifth Int. Conf. of Environmental Ergonomics).

Tables 1 and 2 below show properties for nine example membranes (Examples 1-9) and four comparative membranes (Comparative Examples 1-4). Examples 1-9 all utilized polyethylene membranes and exhibited low acoustic transmission loss 24 hours after a pressure test (as shown in Table 3). Conversely, Comparative Examples 1-4 exhibited high acoustic transmission losses 24 hours after a pressure test.

Sample assemblies and comparative sample assemblies described and tested herein were prepared as follows.

All example sample assemblies and comparative sample assemblies are composed of two adhesive-backed fiberglass sample carriers that are used to construct a sandwich containing the flat sheet membrane-referred to simply as fiberglass sample carriers from this point forward. The fiberglass sample carriers were prepared by applying a double-sided pressure sensitive adhesive (Tesa® 4983) to one side of a fiberglass sheet (purchased commercially from McMaster-Carr, product #1331T37). The fiberglass/adhesive sheets were then laser cut into coupons. A 1.5 mm diameter hole was then fabricated in the center that aligned with the inner bore of the impedance tube and corresponds to the active area of the sample to be measured.

A piece of membrane positioned in a four-sided rectangular cardboard frame is partially cut free from two adjacent sides of the frame to relieve residual tension and placed on a smooth and level surface so that the membrane is flat and free of any wrinkles. The adhesive release liner was removed from a pre-cut fiberglass sample carrier to expose the adhesive. With adhesive layer exposed, the sample carrier was gently placed onto the membrane and any excess membrane was cut away from the perimeter of the sample carrier. The sample carrier was then placed onto an alignment jig with membrane side facing up. The release liner was removed from a second fiberglass sample carrier and placed onto the alignment jig with adhesive side facing down, towards the membrane. Light (i.e., manual) pressure was applied to bring the bottom and top sample carriers together to form an assembly having the following stack up: fiberglass sample carrier/adhesive/membrane/adhesive/fiberglass sample carrier.

Example 1

A gel-processed ultra-high-molecular-weight polyethylene (UHMWPE) membrane with a mass/area of 2.44 g/m², a bubble point of 148 psi, an airflow of 4.9 L/hr at 12 mbar and 2.99 cm², a thickness of 9.6 microns, a porosity of 73%, a surface area per volume of 65 [$10^6$/m], a maximum tensile strength in a first direction of 280 MPa, a maximum tensile strength in a second direction (orthogonal to the first direction) of 241 MPa, a tensile modulus in the first direction of 623 MPa, and a tensile modulus in the second direction of 509 MPa.

Example 2

A gel-processed UHMWPE membrane with a mass/area of 2.63 g/m², a bubble point of 148 psi, an airflow of 3.8 L/hr at 12 mbar and 2.99 cm², a thickness of 9.6 microns, a porosity of 70.9%, a surface area per volume of 59.1 [$10^6$/m], a maximum tensile strength in a first direction of 240 MPa, a maximum tensile strength in a second direction (orthogonal to the first direction) of 216 MPa, a tensile modulus in the first direction of 452 MPa, and a tensile modulus in the second direction of 386 MPa.

Example 3

A gel-processed membrane with an oleophobic coating applied by exposing the membrane of Example 2 to a mixture of 0.5% FluoroPel 800 Perfluoroalkyl co-polymer (source: Cytonix) and 3M Fluorinert Liquid FC-84 (source: 3M) and drying for approximately 15 min in an 80° C. convection oven. The coated membrane had properties of a mass/area of 2.60 g/m², a bubble point of 178 psi, an airflow of 1.7 L/hr at 12 mbar and 2.99 cm², a thickness of 8.8 microns, a porosity of 68.6%, a surface area per volume of 47.8 [$10^6$/m], a maximum tensile strength in a first direction of 234 MPa, a maximum tensile strength in a second direction of 192 MPa, a tensile modulus in the first direction of 578 MPa, and a tensile modules in the second direction of 420 MPa.

Example 4

A gel-processed UHMWPE membrane with a mass/area of 2.63 g/m², a bubble point of 148 psi, an airflow of 3.8 L/hr at 12 mbar and 2.99 cm², a thickness of 9.6 microns, a porosity of 70.9%, a surface area per volume of 59.1 [$10^6$/m], a maximum tensile strength in a first direction of 240 MPa, a maximum tensile strength in a second direction of 216 MPa, a tensile modulus in the first direction of 452 MPa, and a tensile modulus in the second direction of 386 MPa.

Example 5

A gel-processed UHMWPE membrane with a mass/area of 3.85 g/m², a bubble point of 135 psi, an airflow of 3.8 L/hr at 12 mbar and 2.99 cm², a thickness of 12.6 microns, a porosity of 67.4%, a surface area per volume of 62.9 [$10^6$/m], a maximum tensile strength in a first direction of 267 MPa, a maximum tensile strength in a second direction of 225 MPa, a tensile modulus in the first direction of 594 MPa, and a tensile modulus in the second direction of 499 MPa.

Example 6

A gel-processed UHMWPE membrane with a mass/area of 3.83 g/m², a bubble point of 135 psi, an airflow of 3.1 L/hr at 12 mbar and 2.99 cm², a thickness of 12.6 microns, a porosity of 67.5%, a surface area per volume of 59.8 [$10^6$/m], a maximum tensile strength in a first direction of 328 MPa, a maximum tensile strength in a second direction of 190 MPa, a tensile modulus in the first direction of 442 MPa, and a tensile modulus in the second direction of 279 MPa.

Example 7

A gel-processed membrane with an oleophobic coating applied by exposing the membrane of Example 6 to a mixture of 0.5% FluoroPel 800 perfluoroalkyl co-polymer (source: Cytonix) and 3M Fluorinert Liquid FC-84 (source: 3M) and drying for approximately 15 min in 80° C. convection oven. The coated membrane had properties of a mass/area of 2.60 g/m², a bubble point of 165 psi, an airflow of 2.2 L/hr at 12 mbar and 2.99 cm², a thickness of 13.6 microns, a porosity of 69.7%, a surface area per volume of 49.6 [$10^6$/m], a maximum tensile strength in a first direction of 277 MPa, a maximum tensile strength in a second direction of 150 MPa, a tensile modulus in the first direction of 460 MPa, and a tensile modulus in the second direction of 356 MPa.

Example 8

A gel-processed UHMWPE membrane with a mass/area of 3.83 g/m², a bubble point of 135 psi, an airflow of 3.1 L/hr at 12 mbar and 2.99 cm², a thickness of 12.6 microns, a porosity of 67.5%, a surface area per volume of 59.8 [$10^6$/m], a maximum tensile strength in a first direction of 328 MPa, a maximum tensile strength in a second direction of 190 MPa, a tensile modulus in the first direction of 442 MPa, and a tensile modulus in the second direction of 279 MPa.

Example 9

A gel-processed UHMWPE membrane having a mass/area of 2.5 g/m², a bubble point of 177 psi, an airflow of 2.5

L/hr at 12 mbar and 2.99 cm$^2$, a thickness of 6.1 microns, a porosity of 57.1%, a surface area per volume of 64.7 [10$^6$/m], a maximum tensile strength in a first direction of 306 MPa, a maximum tensile strength in a second direction of 155 MPa, a tensile modulus in the first direction of 910 MPa, and a tensile modulus in the second direction of 428 MPa.

Comparative Example 1

Using a biaxial pantograph machine, a gel-processed membrane identical to the membrane in Example 1 was heated to 120° C. for 180 seconds while restrained in both longitudinal and transverse directions. The sample was then retracted in the transverse direction at a rate of 2%/sec to 85% of its initial length in that direction. The final properties included a mass/area of 3.3 g/m$^2$, an airflow of 2.5 L/hr at 12 mbar and 2.99 cm$^2$, a thickness of 8.4 microns, a porosity of 58.2%, a surface area per volume of 34.9 [10$^6$/m], a maximum tensile strength in a first direction of 264 MPa, a maximum tensile strength in a second direction of 169 MPa, a tensile modulus in the first direction of 511 MPa, and a tensile modulus in the second direction of 254 MPa.

Comparative Example 2

Using a biaxial pantograph machine, a gel-processed membrane identical to the membrane in Example 2 was heated to 120° C. for 180 seconds while restrained in both longitudinal and transverse directions. The sample was then retracted in the transverse direction at a rate of 2%/sec to 85% of its initial length in that direction. The final properties included a mass/area of 3.24 g/m$^2$, a bubble point of 118 psi, an airflow of 4.7 L/hr at 12 mbar and 2.99 cm$^2$, a thickness of 9.8 microns, a porosity of 64.8%, a surface area per volume of 38.3 [10$^6$/m], a maximum tensile strength in a first direction of 289 MPa, a maximum tensile strength in a second direction of 196 MPa, a tensile modulus in the first direction of 655 MPa, and a tensile modulus in the second direction of 323 MPa.

Comparative Example 3

Using a biaxial pantograph machine, a gel-processed membrane identical to the membrane in Example 2 was heated to 120° C. for 180 seconds while restrained in both longitudinal and transverse directions. The final properties included a mass/area of 2.6 g/m$^2$, a bubble point of 123 psi, an airflow of 4.5 L/hr at 12 mbar and 2.99 cm$^2$, a thickness of 7.4 microns, a porosity of 62.9%, a surface area per volume of 36.3 [10$^6$/m], a maximum tensile strength in a first direction of 270 MPa, a maximum tensile strength in a second direction of 172 MPa, a tensile modulus in the first direction of 787 MPa, and a tensile modulus in the second direction of 752 MPa.

Comparative Example 4

A commercially available gel-processed lithium ion battery separator membrane (Gelon LIB Group of China) with a mass/area of 10.7 g/m$^2$, a thickness of 16 micron, a matrix tensile strength of 28,800 psi in the longitudinal direction, and an MTS of 23,600 psi in the transverse direction was placed in a biaxial pantograph machine. The starting membrane was heated to 125° C. for 180 sec while restrained in both directions. The sample was then expanded in the transverse and machine direction at 1%/sec to a ratio of 3:1 in each direction. The final properties included a mass/area of 1.63 g/m$^2$, a bubble point of 95 psi, an airflow of 16 L/hr at 12 mbar and 2.99 cm$^2$, a thickness of 6.2 microns, a porosity of 72.1%, a surface area per volume of 48.4 [10$^6$/m], a maximum tensile strength in a first direction of 394 MPa, a maximum tensile strength in a second direction of 317 MPa, a tensile modulus in the first direction of 1265 MPa, and a tensile modulus of 890 MPa.

TABLE 1

| Example No. | Polymer Type | Avg Sv (10$^6$/m) | % Porosity | Bubble Point Pressure (psi) | Permeability (m$^2$) |
|---|---|---|---|---|---|
| Example 1 | Polyethylene | 65.0 | 73.0 | 148 | 9.80E−16 |
| Example 2 | Polyethylene | 59.1 | 70.9 | 148 | 9.80E−16 |
| Example 3 | Polyethylene | 47.8 | 68.6 | 178 | 3.03E−16 |
| Example 4 | Polyethylene | 59.1 | 70.9 | 148 | 9.80E−16 |
| Example 5 | Polyethylene | 62.9 | 67.4 | 135 | 9.82E−16 |
| Example 6 | Polyethylene | 59.8 | 67.5 | 135 | 9.82E−16 |
| Example 7 | Polyethylene | 49.6 | 69.7 | 165 | 6.30E−16 |
| Example 8 | Polyethylene | 59.8 | 67.5 | 135 | 9.82E−16 |
| Example 9 | Polyethylene | 64.7 | 57.1 | 177 | 3.10E−16 |
| Comparative Example 1 | Polyethylene | 34.9 | 58.2 | Not measured | 4.35E−16 |
| Comparative Example 2 | Polyethylene | 38.3 | 64.8 | 118 | 9.55E−16 |
| Comparative Example 3 | Polyethylene | 36.3 | 62.9 | 123 | 6.90E−16 |
| Comparative Example 4 | Polyethylene | 48.4 | 72.1 | 95 | 2.65E−15 |

TABLE 2

| Example No. | Non-contact Thickness (μm) | Tensile Modulus (MPa) - First Direction | Tensile Modulus (MPa) - Second Direction | Modulus balance ratio | Geo Mean Modulus (MPa) | Avg % recovery at 1 hour time point after 1 bar pressure test |
|---|---|---|---|---|---|---|
| Example 1 | 9.6 | 623 | 509 | 1.2 | 563 | 99% |
| Example 2 | 9.6 | 452 | 386 | 1.2 | 418 | Not measured |
| Example 3 | 8.8 | 578 | 420 | 1.4 | 493 | 99% |
| Example 4 | 9.6 | 452 | 386 | 1.2 | 418 | 98% |
| Example 5 | 12.6 | 594 | 499 | 1.2 | 545 | 99% |
| Example 6 | 12.6 | 442 | 279 | 1.6 | 351 | Not measured |
| Example 7 | 13.6 | 460 | 356 | 1.3 | 405 | 98% |
| Example 8 | 12.6 | 442 | 279 | 1.6 | 351 | 98% |
| Example 9 | 6.1 | 910 | 428 | 2.1 | 624 | 99% |
| Comparative Example 1 | 8.4 | 511 | 254 | 2.0 | 360 | 50.8% |

TABLE 2-continued

| Example No. | Non-contact Thickness (μm) | Tensile Modulus (MPa) - First Direction | Tensile Modulus (MPa) - Second Direction | Modulus balance ratio | Geo Mean Modulus (MPa) | Avg % recovery at 1 hour time point after 1 bar pressure test |
|---|---|---|---|---|---|---|
| Comparative Example 2 | 9.8 | 655 | 323 | 2.0 | 460 | 45.5% |
| Comparative Example 3 | 7.4 | 787 | 752 | 1.0 | 770 | 68.4% |
| Comparative Example 4 | 6.2 | 1265 | 890 | 1.4 | 1061 | 51.7% |

TABLE 3

| Example No. | Avg delta TL (dB) 24 hr after 1 bar open hole challenge @ 1 KHz | Avg delta TL (dB) 24 hr after 1 bar open hole challenge @ 3 KHz | Avg delta TL (dB) 24 hours after 1 bar pressure test @ 10 KHz |
|---|---|---|---|
| Example 1 | 1.5 | 1.1 | 0.9 |
| Example 2 | -0.4 | -0.8 | -0.9 |
| Example 3 | 1.1 | 0.3 | -0.2 |
| Example 4 | -2 | -1.8 | -1.5 |
| Example 5 | 1.5 | 1.6 | 1.6 |
| Example 6 | -0.4 | -0.3 | -0.3 |
| Example 7 | 0.1 | -0.1 | -0.4 |
| Example 8 | -0.8 | -0.7 | -0.5 |
| Example 9 | -1 | -1.3 | -1.2 |
| Comparative Example 1 | 11.4 | 12.5 | 12.7 |
| Comparative Example 2 | 15.1 | 22.2 | 22.7 |
| Comparative Example 3 | 11.2 | 11.3 | 11.6 |
| Comparative Example 4 | 6.2 | 1265 | -0.9 |

As can be seen in Table 3, the transmission loss in Comparative Examples 1-4 was higher than the inventive Examples 1-9.

Among those benefits and improvements that have been disclosed, other objects and advantages of this disclosure will become apparent from the following description taken in conjunction with the accompanying figures. Detailed embodiments of the present disclosure are disclosed herein; however, the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

All prior patents, publications, and test methods referenced herein are incorporated by reference in their entireties.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. An assembly comprising:
   an acoustic device, wherein the acoustic device comprises:
   a polyethylene membrane having:-
   a thickness of 0.5 μm to 14 μm, the thickness defining a thickness direction;
   a surface area per volume of at least $39 \times 10^6$/m;
   a geometric mean tensile modulus of 250 to 750 MPa;
   a maximum tensile modulus in a first direction of 440 to 915 MPa, wherein the first direction is orthogonal to the thickness direction; and
   a maximum tensile modulus in a second direction of 275 to 515 MPa, wherein the second direction is orthogonal to the thickness direction and the first direction.

2. The assembly of claim 1, wherein the acoustic device is one of a speaker, a microphone, or any combination thereof.

3. The assembly of claim 1, wherein the acoustic device has an average transmission loss (dB) that varies by less than 2.1 dB when tested using a WEP test at 24 hours after 1 bar open hole challenge @ 3 KHz.

4. The assembly claim 1, wherein the polyethylene membrane has a tensile modulus balance of 1 to 2.1.

5. The assembly of claim 1, wherein the geometric mean tensile modulus is from 350 to 650 MPa.

6. The assembly of claim 1, wherein the polyethylene membrane has a porosity of 50% to 95%.

7. The assembly of claim 1, wherein the polyethylene membrane has a porosity of 55% to 86%.

8. The assembly of claim 1, wherein a percent recovery at 1 hour after 1 bar open hole challenge is at least 69%.

9. The assembly of claim 1, wherein the polyethylene membrane has a bubble point from 7 psi to 200 psi.

10. The assembly of claim 1, wherein the polyethylene membrane has a permeability from $1 \times 10^{-15}$ m$^2$ to $8 \times 10^{-15}$ m$^2$.

11. The assembly of claim 1, wherein the polyethylene membrane has a permeability from $3 \times 10^{-16} \, m^2$ to $7.4 \times 10^{-15} \, m^2$.

12. The assembly of claim 1, wherein the polyethylene membrane is an expanded polyethylene membrane.

13. The assembly of claim 1, wherein the maximum tensile modulus in the first direction is greater than the maximum tensile modulus in the second direction.

14. The assembly of claim 1, wherein the first direction is one of the longitudinal direction and the transverse direction of the polyethylene membrane and the second direction is the other one of the longitudinal direction and the transverse direction of the polyethylene membrane.

15. The assembly of claim 1, wherein the tensile modulus is the gradient of a plot of stress/strain in which the tensile modulus is calculated starting at the zero strain point by making a series of linear fits of stress versus strain for sequential groups of every five data points collected by a tensile test machine and the specific group of sequential data having the linear fit of maximum gradient was selected as the maximum tensile modulus; and three samples in each orthogonal direction were tested and their respective averages were reported, in which the larger of the two average maximum tensile moduli determined for the two orthogonal directions is assigned that of the first direction and the smaller of the two average maximum tensile moduli determined for the two orthogonal directions is assigned that of the second direction.

* * * * *